United States Patent [19]

Wallis

[11] Patent Number: 4,594,622
[45] Date of Patent: Jun. 10, 1986

[54] TRACK FOLLOWING SERVO SYSTEM FOR A DISK FILE

[75] Inventor: Christopher N. Wallis, Eastleigh, England

[73] Assignee: International Business Machines Corporation, Armonk, N.Y.

[21] Appl. No.: 606,009

[22] Filed: May 2, 1984

[30] Foreign Application Priority Data

Jun. 30, 1983 [EP] European Pat. Off. ........ 83303793.0

[51] Int. Cl.⁴ ................................................. G11B 5/56
[52] U.S. Cl. ........................................ 360/77; 318/561
[58] Field of Search ............................ 360/77; 318/561

[56] References Cited

U.S. PATENT DOCUMENTS 4,149,199  4/1979  Chick et al. ............................ 360/77
4,536,809  8/1985  Sidman ................................... 360/77

Primary Examiner—George G. Stellar
Attorney, Agent, or Firm—Thomas R. Berthold

[57] ABSTRACT

The performance of a track-following servo system for a disk file is improved by the feeding forward of a prediction of track eccentricity into the normal feedback control loop. The eccentricity related function is derived by combining functions of the position error signal and of the input signal to the head position actuator during at least one revolution of the disk. The eccentricity function is stored and then fed forward to the actuator during a subsequent revolution of the disk. The eccentricity function may be a track shape position signal formed from the difference of the PES and the double time integral of the actuator current. Alternatively it may be an actuator current profile formed from the difference between the actual current and the double time derivative of the PES.

7 Claims, 3 Drawing Figures

TRACK FOLLOWING SERVO SYSTEM FOR A DISK FILE

TECHNICAL FIELD OF THE INVENTION

The present invention relates to servo systems of the track-following type for use in disk files.

BACKGROUND ART

Disk files in which information is stored on concentric tracks on one or more recording disks are well known. Information is written on and/or read from a disk, while it is rotating, by a transducing head supported adjacent the disk surface. Magnetic disk files are the most common, particularly for data processing applications. Such files employ an electromagnetic head in conjunction with a magnetisable recording disk. However, other transducing effects, e.g. optical and electrostatic, are known and are of increasing importance in the video recording industry.

Irrespective of the transducing effect or the precise application, at the higher track densities the disk file must be provided with position reference information which is employed by a head positioning servo system to position and maintain the head precisely over a selected track of the disk. The operation of maintaining the head over a desired track is known as "track-following", whereas that of moving the head between tracks is known as "track-accessing". It is with improvements in the track-following operation that the present invention is concerned.

In some disk files, the position reference information is provided remotely from the disk surface on which the information or data to be process is stored, e.g. on a dedicated servo disk or surface, and is available continuously. It is also known to provide position reference information in sectors, known as "servo sectors", on the information storage surface. These servo sectors are interspersed with "data sectors" containing the stored information and provide accurately registered position reference information on a sampled basis as the rotates disk.

Whichever form the position reference information takes, it defines nominally circular tracks on the disk which are intended to be concentric with the axis of rotation of the disk medium. For various reasons neither the circularity nor the concentricity of the tracks so defined may be perfect. In the case of removable disks, the rotation axes of different drive mechanisms may not all align concentrically with the tracks on a particular disk, when mounted for rotation in the drive mechanism. Also, defects in the record medium itself may result in errors in the written position reference information. Finally, especially in the case of flexible disk media, the shape of the disk itself may change with age as a result of temperature and humidity cycling.

The above factors together with mechanical runout (radial displacement) of the disk when it is rotated can all, of course, be accommodated, to some extent, by the operation of the track-following servo system. However, there is a limit to the responsiveness (gain) of such servo systems if instabilities at certain resonant frequencies are to be avoided. This means that, where significant eccentricity exists, the servo system is not capable of following deviations of the tracks exactly and errors in reading and writing data may result. In any event, the achievable track density is restricted which, in turn, imposes a limit on the information storage capacity of the disks.

As employed herein, the term "eccentricity" is intended to encompass both non-concentricity of a circular track with the axis of rotation of the disk and also non-circularity, e.g. ovality, of the track, whether concentric with the axis of rotation or not.

Where the cause of error is permanent and fixed, e.g. a defect in the magnetisable record medium, it has been proposed to include servo correction data in the position reference information at the time of manufacture. One such scheme is described in our U.S. Pat. No. 4,412,165. In that application, a servo correction byte is associated with each servo sample to correct defects in faulty servo samples.

In other cases, such as gradual distortion of disks with age or the remounting of disks on different drive apparatus, it has been recognised in the art that a predictive correction can be applied directly to the servo system, providing the error is repeatable during operation.

One such proposal is described in an article by J. P. Mantey entitled "Disk Runout Accommodation" (IBM Technical Disclosure Bulletin, Vol. 21, No. 7, December 1978). In the system proposed in that article, an estimate of runout is used in combination with a closed loop track-following servo system. The runout estimate is computed on the basis of a mathematical model of the dynamic behaviour of the system.

In U.S. Pat. No. 4,135,217, a hybrid servo system for positioning the heads of a disk file is described. Track-following is effected by means of sector servo samples, interspersed with the data, which are detected by a read/write head. The head is moved by means of an actuator (motor and carriage) which has its own position transducer of the optical grating type. The access motion is primarily controlled by reference to this external transducer. However, to overcome some of the above-mentioned disadvantages, the output of the external transducer is also stored while the head is track-following to provide an indication of the "wobble", or repeatable error in track shape. It is assumed that, when the head is fine-positioned (i.e. track-following) during an initial calibration period, the variation in the external transducer output will indicate the deviation of the track being followed from concentricity. This information, which is stored in digital form for each sector, is used to predict subsequent fine positioning movement of the head in addition to the normal closed loop feedback control of head position error.

Finally, to complete the review of the prior art, reference is made to the following articles: "Self-calibrating disk storage apparatus" by D. E. Griffiths and H. E. Van Winkle (IBM Technical Disclosure Bulletin, Vol. 19, No. 6, November 1976, p. 1991); "Track-locating and following apparatus for a flexible disk file" by R. C. Jahnke (IBM Technical Disclosure Bulletin, Vol. 23, No. 2, July 1980, p. 738). These articles both describe open loop rather than track-following head positioning systems for disk files. However, both employ a limited amount of servo information which can be used to generate a representation of track shape. This representation is stored and used subsequently to modify the open loop positioning control of the heads as the disk rotates.

DISCLOSURE OF THE INVENTION

The prior art, as described above, has recognised that the performance of a track-following servo system for a disk file can be improved if repeatable runout or eccentricity is measured or predicted and fed forward as an additional control input to the head positioning actuator in addition to the normal closed loop feedback control based on head position error measurement. The measurement of eccentricity as shown in the prior art, particularly U.S. Pat. No. 4,135,217, relies on the assumption that, while the head is track-following, independent measurement of the actuator position will represent the actual track shape. This is not true unless the track-following is perfect, which, for the reasons given above, is unlikely to be the case where significant eccentricity exists. Similarly, the prior art showing derivation of a track shape or eccentricity representation from a head position error signal alone depends on the actuator being fixed in a position while the head position error signal is derived. This is not the case in a track-following system.

The present invention, in its broadest aspect, depends on the realisation that, in general, an accurate eccentricity representation can only be derived from a combination of both actuator and head position information. Accordingly, the invention provides a track following servo system for a disk file in which information is recorded in nominally concentric circular tracks on a rotatable disk record, the system comprising: position reference information on the same or on an associated disk record for defining the position of the tracks; a transducing head for reading said position reference information during rotation of the disk; a demodulator for producing, from the position reference information read back by the head, a position error signal which is representative of the deviation of the head from a selected one of the tracks; an actuator, responsive to an electrical input signal, to move the head across the disk; a feedback path connecting the demodulator output to the actuator input; means for providing an indication of actuator motion; means responsive to said indication to derive a signal related to the eccentricity of the tracks; storage means for storing the eccentricity related signal; and a feedforward path connecting the storage means output to the actuator input so that the actuator input signal is a combination of the signals on said feedback and feedforward paths; characterised in that: the means for deriving the eccentricity related signal is arranged to combine a function of the actuator motion indication and a function of the position error signal, during at least one revolution of the disk, to produce said eccentricity related signal for storage by the storage means.

Thus, by employing both an actuator motion indication and the sensed head position error signal, a more accurate eccentricity representation than that of the prior art is achieved.

The "functions" of the actuator motion indication and position error signal which are combined should be understood to include these quantities in unmodified form. The preferred method of combining the functions is to form the algebraic difference between them. In the simplest case of all, a representation of track shape or eccentricity would be given by the difference between the position error signal and a measurement or indication of actuator position at various points around the track. However, the functions combined need not be positions, dimensionally, but may be time derivatives such as velocity or acceleration.

The preferred means for providing an indication of actuator motion derives the indication from the actuator input signal. Where the input signal represents the current to be applied to an electromagnetic moving coil type of actuator, the input signal is indicative of the acceleration of the actuator rather than its position. Making use of the actuator input signal to indicate actuator motion affords the considerable advantage over the prior art that no additional independent actuator position transducer, such as the grating transducer of U.S. Pat. No. 4,135,217, is required.

Such an acceleration related actuator input signal may be double integrated with respect to time to give, effectively, a representation of actuator position. In this case the position error signal is applied, unmodified, with the actuator position representation to a differencing means. The output from the differencing means is a direct representation of track eccentricity which is stored in the storage means. To convert this representation to an appropriate input signal for feeding forward to the actuator, it must first be double differentiated with respect to time as it is read out of the storage means.

In the preferred system, which is an alternative to that just described, the difference between the double derivative of the position error signal with respect to time and the unmodified actuator input signal is formed and stored. The stored quantity, in this case, is also related to the eccentricity of the tracks but represents the current profile needed to drive the actuator to follow the particular eccentricity. It can thus be applied directly as an actuator input signal, preferably through a low pass filter.

It should be clear from the above that the storage means is a serial input and output device. In practice, an inbuilt delay corresponding to one revolution of the disk has been found adequate, though, clearly, longer delay periods over which an average eccentricity related function can be formed are also possible. The preferred implementation of the storage means, in a digital system, is a first-in-first-out register.

The invention will now be described, by way of example only, with reference to preferred embodiments thereof, as illustrated in the accompanying drawings.

DETAILED DESCRIPTION OF THE INVENTION

Figure 1:
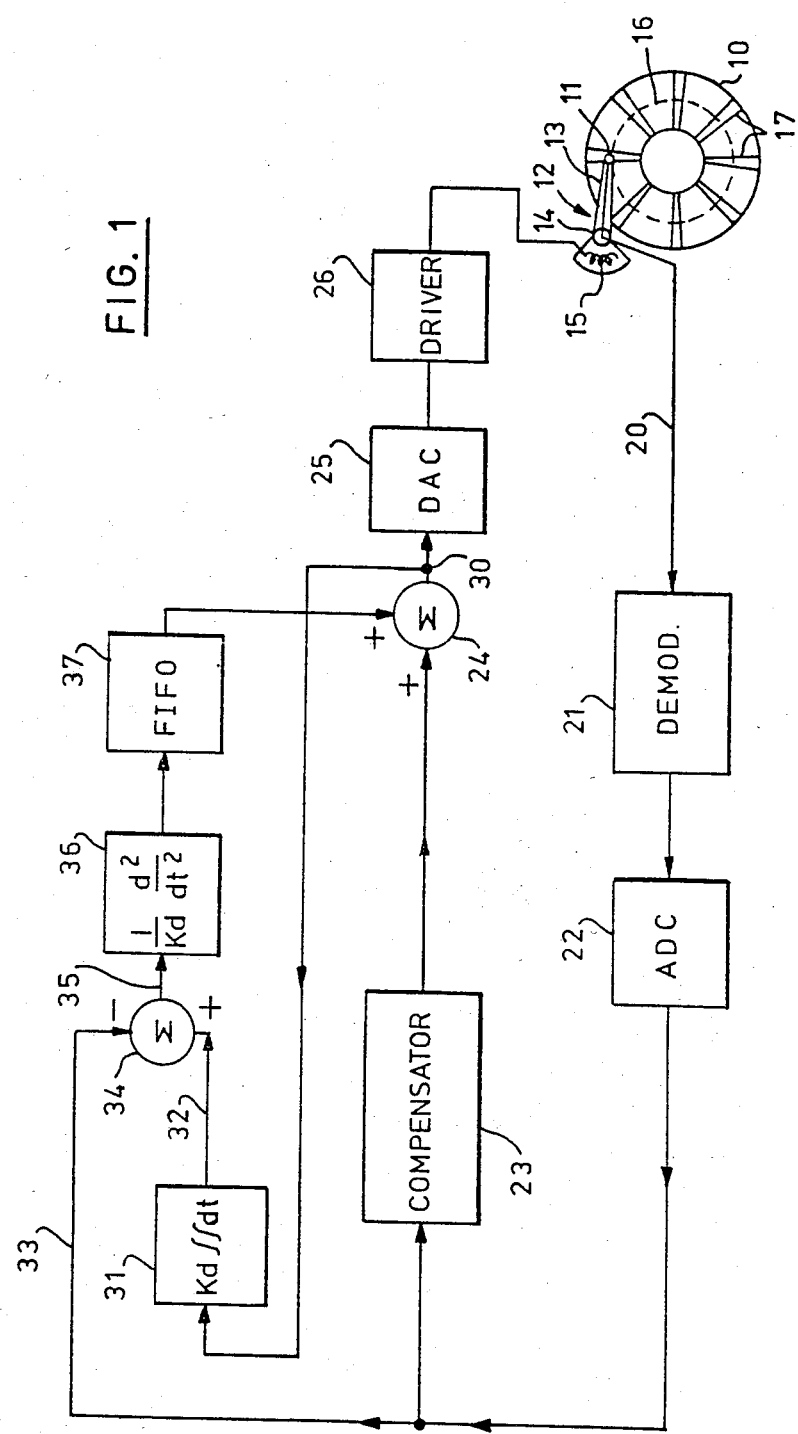
FIG. 1 is a schematic block diagram of one track-following servo system for a disk file according to the present invention.

A block diagram of one track-following servo system according to the invention is shown in FIG. 1. For ease of explanation and to illustrate most clearly the principles involved some details of a conventional nature have been omitted. The relevant mechanical components of the disk file are illustrated schematically and include a disk 10, a magnetic read/write head 11 and a head positioning actuator 12 of the swinging arm type. This actuator which is of the type described in greater detail in U.S. Pat. No. 4,286,298 comprises an arm 13 which is pivotally mounted for rotation about post 14. A coil 15 is mounted on the opposite side of the pivot post 14 to the head and is located in the flux gap of a permanent magnet (not shown). In response to applied current, the coil rotates the arm 13 about the pivot post 14 thereby moving the head 11 across the surface of the disk.

Information is stored on the disk in a band of nominally concentric circular tracks, such as that at 16 over which the head 11 is shown positioned. The position of the information bearing tracks is defined, in this example, by position reference information (or servo samples) recorded in sectors 17 interspersed with the data on the disk. The number of sectors shown has been kept small for ease of illustration. In fact, seventy two such sectors are employed. The nature of the position reference information is not important to an understanding of the invention but may be of the form shown in FIG. 3. As is conventional, the boundaries between mutually distinguishable alternating circumferential bands of position reference information (sometimes known as servo tracks) define the centrelines of the information bearing tracks.

Because the present invention is concerned with track-following, no description of the track-accessing aspects of the head positioning system is included. However, a suitable access control system for use in conjunction with the track-following system of FIG. 1 is described in U.S. Pat. No. 4,103,314.

In conventional fashion, the output of the read/write head on line 20 is separated, by means not shown, into its data and its position reference components and the latter are applied to a demodulator 21. The demodulator produces from the position reference information a position error signal ("PES") whose magnitude and polarity indicates the displacement of head 11 from the nearest track centreline. The system shown in FIG. 1 is digital, though this is not essential, and the analogue PES is therefore converted to a digital PES in analogue-to-digital converter 22. The digital PES is fed back to control the actuator 12 via negative feedback loop comprising a compensator 23 and summing junction 24, whose function is explained below. The compensated digital PES is then applied to a digital-to-analog converter 25 whose output is applied to an actuator driver circuit 26. The compensator 23 is a digital recursive filter whose gain and phase shifting characteristics are chosen to produce the best track-following and settling characteristics which can be achieved consistent with acceptable stability margins.

As thus far described, the system is a conventional track-following system in which the head movement is controlled so as to attempt to null the position error signal thereby maintaining the head over the track. However, as explained above, the ability of such a system to follow all excursions of the tracks from a fixed radius is limited by the low bandwidth of the feedback loop. This low bandwidth is a consequence, in the example of FIG. 1, both of the sampled nature of the position reference information and of the need, in all such systems, to avoid instabilities caused by mechanical resonances at high frequencies. Thus, if significant repeatable excursions exist, e.g. because of non-concentric mounting or change in shape of the disk, the head will be misregistered with the information tracks for some of the time. Such misregistration can lead to overwriting of previously written information and to degradation of the signal read back by the head. This off-track performance degradation imposes a limit on the achievable track density of the particular file.

The remaining portions of FIG. 1 enable the track-following performance of the file to be significantly improved. This is achieved by measuring and storing a signal related to the eccentricity of the tracks and, later, feeding the stored signal forward as an additional input to the actuator.

To measure the eccentricity of the tracks, the digital version of the input signal to the actuator driver 26 is picked off at junction 30 and applied to a digital double integrator 31. This forms the double numerical integral with respect to time of the actuator input signal. This input signal is related to the acceleration of the actuator by a constant, $K_d$, which represents the change in actuator acceleration caused by a change of one unit in the digital input to the driver. Thus, by multiplying the double integral by $K_d$, a signal is produced on line 32 which varies as the position of the actuator 12. The signal is not, however, directly proportional to actuator deviation from a given radial position because of the arbitrary constants introduced by the integration to which values must be assigned.

The difference between this actuator position signal on line 32 and the digital PES on line 33 is obtained in summation unit 34 by applying the digital PES to an inverting input of the unit. The output, on line 35, is representative of the absolute shape of the track (again, including the arbitrary integration constant). That this is so can be seen intuitively by considering the two extreme cases. With the actuator 12 fixed, the PES alone would indicate the track shape. Alternatively, with perfect track-following, and thus zero PES, the actuator position would indicate the track shape. In general, the shape is the difference between the two.

To convert this track shape representation to a feed-forward input for the actuator, it is necessary to convert the representation back to the dimensions of an acceleration, and, by a further division by $K_d$, to an input current. This step is effected by a numerical double differencing method in double differentiator 36 which eliminates the arbitrary integration constants. The output of differentiator 36 is the serial input signal which, if applied to the actuator, would have caused it to follow the previous track. This serial input signal, which may also be thought of as a current profile, is stored for one revolution in a delay element 37 which is a first-in-first-out buffer.

On the assumption that the errors causing the eccentricity are repeatable, the stored input signal profile is read out from buffer 37 on the subsequent revolution of the disk and applied as a predictive input to the actuator via the summing junction 24. In the absence of any other source of disturbance, the actuator 12 will move head 11 to follow exactly the locus of the track as measured during the previous revolution. The closed loop track-following system, providing the other input to summing junction 24, now has to cope only with deviations from the measured track shape during the previous revolution and not with the full magnitude and bandwidth of the absolute deviations from concentricity. This combination of feedforward and feedback control gives much greater accuracy in track-following as evidenced by a considerable reduction in the peak-to-peak variation of the PES.

Figure 2:
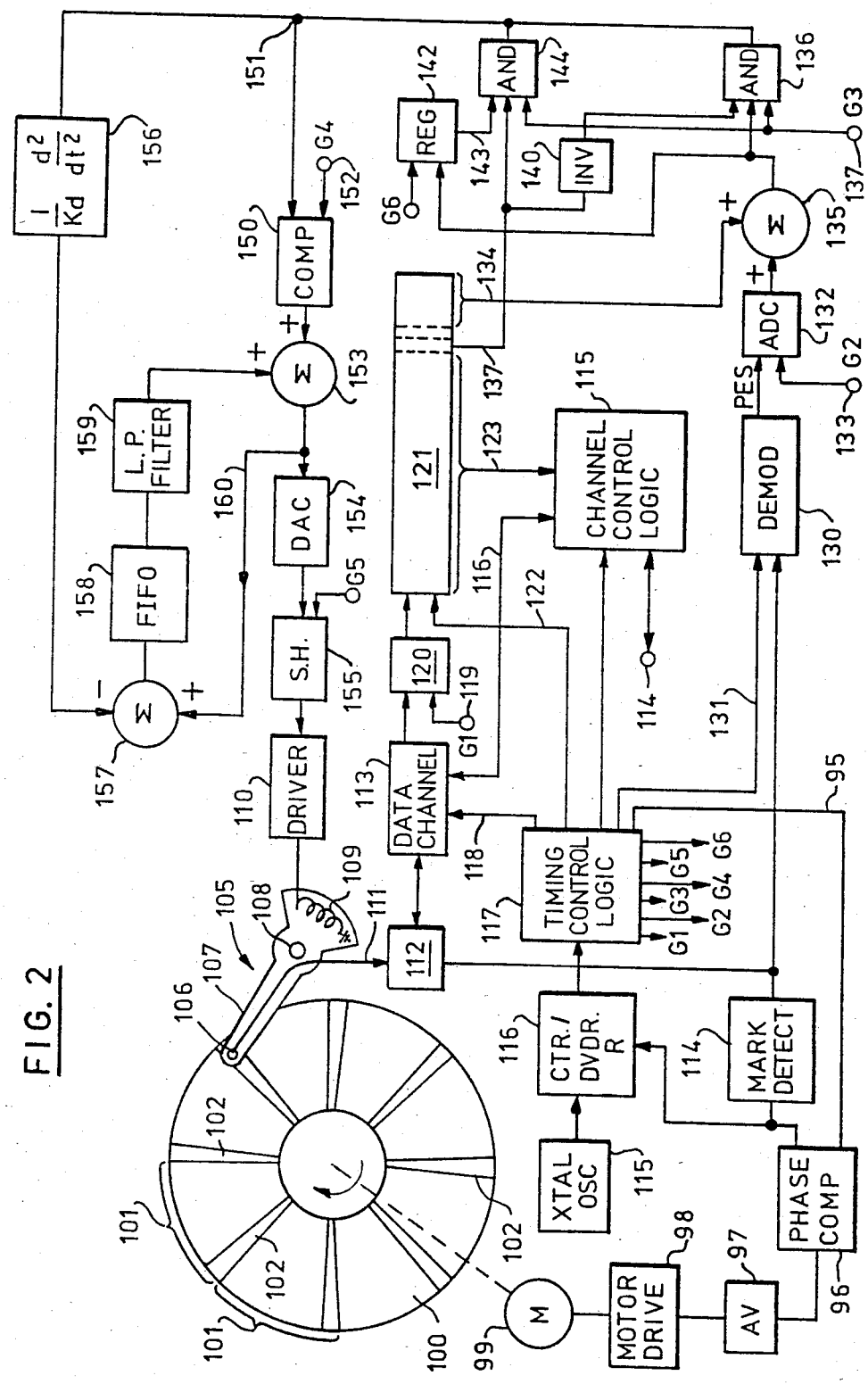
FIG. 2 is a block diagram of another track-following servo system for a disk file according to the present invention.

FIG. 2 shows another example of a system according to the present invention, in more detail than the system of FIG. 1. The system is very similar in its known aspects to that described in the above referenced U.S. Pat. No. 4,412,165. Broadly, the system is part of a sector-servo disk file whose head is positioned, primarily, by negative feedback of a position error signal to an actuator. As described in detail in the referenced patent, servo correction data is included on the disk to correct permanent defects in the sampled position reference information detected at the time of manufacture. As modified according to the present invention, the system of FIG. 2 includes additional provision for correcting for the effects of repeatable runout, whose causes arise in operation or, in any event, after manufacture.

Figure 3:
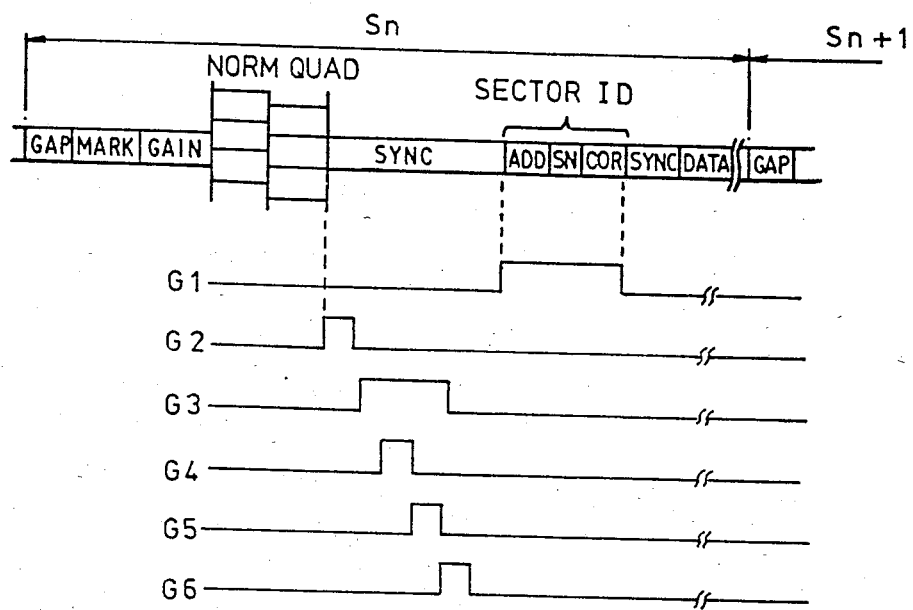
FIG. 3 shows the sector format and associated timing waveforms employed in the disk file and system of FIG. 2.

In detail, the system of FIG. 2 shows a disk 100, divided into sectors 101 by servo samples 102. The format of the sectors 101 is shown in FIG. 3 which also includes a number of binary signals G1-G6 related to the operation of the system. Basically, each sector $S_n$ begins with a short gap followed by the servo sample information 102. This servo sample includes a uniquely detectable mark, a gain reference field and two phases (normal and quadrature) of position reference information. This position reference information is of the so-called "null pattern" type as described, inter alia, in U.S. Pat. No. 4,297,734. Further detail of the detection and demodulation of the servo sample to produce an incremental position error signal can be obtained by reference to this publication. Essentially, the boundary between the normal servo tracks defines the centreline of the associated information track. The quadrature tracks are employed to extend the linear range of the position error signal. Timing of the demodulation and other operations is synchronised with detection of the marks.

Following the servo sample is a synchronising field ("SYNC"), which synchronises circuitry in the read/write channel of the file to receive subsequent housekeeping data. This housekeeping data consists of sector identification ("SECTOR ID") comprising a track address ("ADD"), and a sector number ("SN") followed by a servo correction byte ("COR"). The correction byte contains information as to whether the servo sample position reference information is usable and, if so, the value of any necessary correction factor to be applied. Finally, after a further short synchronising field comes the recorded information ("DATA").

Returning now to FIG. 2, the operation of the system is as follows. An actuator 105 positions a head 106 over the surface of disk 100. The actuator is of the same type as that shown in FIG. 1 and has a swinging arm 107, a pivot 108 and drive coil 109 supplied with current by driver 110.

Signals detected by the read/write head 106 from the disk appear on lead 111 and are pre-amplified in read/write circuit 112. Circuit 112 applies the head signals to a data channel 113, to a mark detect circuit 114 and to a servo channel.

The synchronisation of both the servo and data channels with the rotation of the disk is achieved by means of Mark detect circuit 114. Detection of a Mark, which is uniquely recognisable, is used to reset a counter/divider circuit 116 which produces submultiples of the output of a crystal oscillator 115 for application to timing control logic 117. This logic counts and decodes the input timing reference waveforms from circuit 116 and produces, inter alia, the gating pulses G1-G6, shown in FIG. 3. The timing logic also produces various pulse trains of predetermined frequency to control the timing of data channel and sample demodulation operations.

One output of the timing logic on line 95 is applied to a phase comparator 96 together with the output of Mark detector 114. Any phase difference between the two signals is averaged in averager 97 and applied to motor drive circuit 98 to control the speed of synchronous spindle drive motor 99. In this way the rotational speed of the disk is phase-locked to the output frequency of the crystal oscillator.

A data timing signal generated by timing logic 117 is supplied to the data channel 113 over line 118 to gate the data content of each sector through the channel. The channel 113 performs the conventional functions of data detection and decoding of data read back from the disk. The channel also encodes data for recording and passes it to read/write circuit 112 which also includes a conventional write driver.

Commands concerning the storage or retrieval of data are supplied to the file from an external control unit (not shown) via input/output terminal 114. The commands are interpreted in known manner by channel control logic 115 which controls the transfer of data records to be recorded on the disk or played back from the disk over data bus 116.

Prior to the initiation of each record/playback operation the sector ID field must be checked against the desired sector address. The sector ID field holds the address of the actual disk sector in the form of a track number address and a sector number. This checking process is quite conventional, very often being conducted remote from the file in, for example, the file controller. In this embodiment it is conducted by the file channel control logic as a matter of convenience.

Each sector ID field is gated through AND-gate 120 into shift register 121 under control of gating signal G1, generated by timing logic 117 and supplied to terminal 119. The waveform of signal G1 is shown in FIG. 3. The shift register contains sufficient stages to hold both the entire sector ID field and the servo correction byte, which are clocked in at read time by a predetermined number of read clock pulses supplied from timing logic 117 over line 122. When shift register 121 is full, its contents are sampled over parallel bus 123 and compared with the sector ID of the data record required, held in channel control logic 115. In the event of a match, the subsequent data supplied over data bus 116 is accepted by the logic 115 and transferred to a user unit via output terminal 114.

The track following operation will now be described with reference to FIGS. 2 and 3. As in the case of FIG. 1, a description of the track access control system is not included but reference may be made to U.S. Pat. No. 4,103,314 for details of an appropriate system. The only difference of note is that timing, in the present case, is derived from Marks, as described, rather than from a separate clock head and clock track.

The signals from read/write circuit 112 are also applied to the servo channel, in particular to demodulator 130, along with a demodulator clock on line 131 from timing control logic 117. The operation of the demodulator for the type of servo pattern shown in FIG. 3 is conventional and reference may be made to U.S. Pat. No. 4,297,734 for further detail. At the end of every servo sample 102, the output of the demodulator 130 constitutes an analog position error signal representing the deviation of the head 106 from the track centre, as defined by the position reference information for that sector. The analog PES is converted to a digital PES by analog-to-digital converter 132 under the control of timing signal G2 applied at terminal 133.

Any permanent correction of the digitised PES is indicated by the servo correction byte which was stored in shift register 121 during processing of the housekeeping data of the previous sector. This correction is applied on bus 134 to a summing junction 135. Normally, the corrected digital PES would then be gated through an AND-gate 136 upon the application of timing signal G3 at terminal 137.

However, if a so-called "demark" bit, which is part of the servo correction byte, indicates that the particular servo sample is so faulty as to be unusable, the passage of the digital PES via AND-gate 136 is inhibited. This is effected by inverting the demark bit present on line 137 in an inverter 140 and applying the inverter output to a third input of AND 136. In this event, the digital PES from the previous sample is substituted for the current unusable one.

This is achieved by storing each acceptable digital PES in a register 142 at time G6. The stored PES is then available on line 143 at AND-gate 144. The AND-gate 144 is enabled by the combined presence of the demark bit on line 137 and the timing waveform G3. Further details of the servo sample correction and substitution operations may be found in the above referenced U.S. Pat. No. 4,412,165.

The digital PES, corrected or substituted as necessary, is next applied to a digital compensator 150 via junction 151. The compensator, as in the case of FIG. 1, is a digital recursive filter and provides lead/lag phase compensation which is conventional in closed loop servo systems. The particular filter is designed to have an infinite impulse response so that it can follow a ramp input with zero error. The compensator 150 operates in response to the timing waveform G4 applied at terminal 152.

The compensator output passes via summing junction 153 at which a feedforward control signal is added in accordance with the present invention. This composite control signal is then reconverted to analog in converter 154 and, at time G5, is sampled and held in sample-and-hold circuit 155. One such control signal is formed and held in circuit 155 for each sector. Finally, the control signal is applied to the actuator driver 110 to cause the actuator 105 to move head 106 to follow the desired track on the disk.

As thus far described, the system of FIG. 3 is very similar to that described in U.S. Pat. No. 4,412,165 and provides closed loop track following including a fixed correction for erroneous servo samples. To improve the track following performance even further in accordance with the present invention the system of FIG. 3, like that of FIG. 1 includes means for developing a dynamic correction signal, related to the measured eccentricity of the tracks in operation, and for applying this as an additional feedforward control signal to the actuator driver.

The technique employed is similar to that of FIG. 1 but somewhat simpler. As in FIG. 1, both the actuator input signal, present in digital form on line 160 at the output of summing junction 153, and the digital PES, at junction 151 are employed to produce an eccentricity related signal. However, unlike FIG. 1, the PES is doubly differentiated (by numerical second difference techniques) in differentiator 156 so that it represents the acceleration of the head and is further divided by Kd to convert this acceleration to an equivalent actuator drive current representation. This is then subtracted from the actual digital current being applied to the actuator in summing junction 157. The difference gives, directly, the actuator input signal profile necessary to cause the actuator to follow the track. The sequence of digital values representing the actuator input signal profile for the track are stored for one revolution of the disk in first-in-first-out buffer 158.

In this implementation, a low-pass filter 159 is necessary to guarantee the stability of the system. The condition that the stability of the servo loop should be unaffected by the addition of the feedforward correction system is that the measurement of track shape is independent of the position of the read/write head. This condition would be met if the signal processing were ideal. However, in practice the numerical differentiation process is imperfect and there are computational delays. The effect is that high-frequency disturbances (for which the process is least accurate) may echo from revolution to revolution with ever-increasing amplitude. This is avoided by adding the low-pass filter 159. The penalty is a loss of correction of high-frequency error which is, in any event, unlikely to be consistently repeatable from track to track. The cut-off frequency of the low-pass filter 159 should be above four times the rotational frequency of the disks to permit repeatable error to be corrected while maintaining stability. In the system of FIG. 2 the low pass filter 159 operates by forming the running average of sixteen adjacent servo samples.

The feedforward correction system of FIG. 2 has the advantage over that of FIG. 1 that no integration is involved. Accordingly, possible difficulties in assigning the arbitrary integration constants are avoided.

In the system of FIG. 2, the various digital functions of the feedforward control path may be implemented either by means of an appropriately programmed general purpose microprocessor or in hard-wired individual circuitry. The system of FIG. 2 has been found to reduce the peak-to-peak amplitude of the PES by a factor of three over that found without the additional feedforward eccentricity control.

I claim:

1. A track following servo system for a disk file in which information is recorded in nominally concentric circular data tracks on a rotatable disk record, the system comprising:

position reference information for each of the data tracks, said position reference information being located on the same or on an associated disk record;

a transducing head for reading said position reference information during rotation of the disk;

a demodulator for producing from the position reference information read back by the head, a position error signal which is representative of the deviation of the head from a selected one of the data tracks;

an actuator responsive to an electrical input signal to move the head across the disk during accessing of different data tracks, and to cause the head to follow a selected one of the data tracks in response to the position error signal;

a feedback path connecting the demodulator output to the input to the actuator;

means for providing an actuator motion indication signal, the actuator motion indication signal being derived from the electrical input signal to the actuator;

means operative during data track following for deriving a signal related to the eccentricity of the tracks, said eccentricity signal deriving means further comprising means for combining a function of said actuator motion indication signal and a function of said position error signal during at least one revolution of the disk;

storage means for storing the eccentricity related signal; and a feedforward path connecting the storage means output to the input to the actuator, whereby the actuator input signal for data track following is a combination of the generally instantaneous position error signal on siad feedback path and said previously stored eccentricity related signal on said feedforward path.

2. A system as claimed in claim 1 in which the eccentricity related signal deriving means includes a differencing means for forming the algebraic difference between the function of the actuator motion indication signal and the position error signal function.

3. A system as claimed in claim 2 wherein the actuator is electromagnetic, the actuator input signal is representative of the current in the actuator and is applied unmodified to the differencing means, the position error signal function is the double derivative of the position error signal with respect to time, and the output of the differencing means constitutes said eccentricity related signal for storage in the storage means.

4. A system as claimed in claim 3 in which the feedforward path includes a low pass filter whose cut-off frequency is greater than four times the rotational frequency of the disk.

5. A system as claimed in claim 2 wherein the actuator is electromagnetic, the actuator input signal is representative of the current in the actuator, the function of the actuator motion indication signal is the double integral with respect to time of the actuator input signal, the position error signal is applied unmodified to the differencing means, and wherein the combining means includes means for forming the double derivative of the output of the differencing means with respect to time, said double derivative constituting said eccentricity related signal for storage in the storage means.

6. A system as claimed in claim 1 in which the storage means is a serial device having an inbuilt delay corresponding to one revolution of the disk.

7. A system as claimed in claim 6 which is a digital system, the storage means being a first-in first-out register.

* * * * *